(12) United States Patent
Qiu

(10) Patent No.: US 10,750,290 B2
(45) Date of Patent: Aug. 18, 2020

(54) SOUND, LIGHT AND ELECTRICAL EYE DEVICE FOR POLICE USE

(71) Applicant: Shanghai Valiant Lighting and Audio Technology Co., Ltd, Shanghai (CN)

(72) Inventor: Xiangkang Qiu, Shanghai (CN)

(73) Assignee: SHANGHAI VALIANT LIGHTING AND AUDIO TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 16/503,453

(22) Filed: Jul. 3, 2019

(65) Prior Publication Data

US 2019/0327561 A1    Oct. 24, 2019

Related U.S. Application Data

(63) Continuation of application No. PCT/CN2017/000755, filed on Dec. 26, 2017.

(30) Foreign Application Priority Data

Jan. 3, 2017    (CN) .......................... 2017 1 0003083

(51) Int. Cl.
*H04R 9/06*      (2006.01)
*F21V 33/00*    (2006.01)
(Continued)

(52) U.S. Cl.
CPC .......... *H04R 9/06* (2013.01); *F21V 33/0056* (2013.01); *H04N 5/2251* (2013.01); *H04R 1/023* (2013.01);
(Continued)

(58) Field of Classification Search
CPC ........ H04R 9/06; H04R 9/02; H04R 2400/11; H04R 1/028; F21Y 2115/10; H04N 5/22521; H04N 5/2256; H04N 5/2252
See application file for complete search history.

(56) References Cited

U.S. PATENT DOCUMENTS 3,991,286 A * 11/1976 Henricksen .............. H04R 9/00
                                                                381/189
4,210,778 A *  7/1980 Sakurai ............... F28D 15/0266
                                                                181/156
(Continued)

FOREIGN PATENT DOCUMENTS

CN          2774065 Y     4/2006
CN        201114660 Y     9/2008
(Continued)

*Primary Examiner* — Tuan D Nguyen

(57) ABSTRACT

A sound, light and electrical eye device for police use includes a built-in system, a dual-magnetic steel magnetic circuit and a wing-shaped basin flame made of cast aluminum. The built-in system formed by a photoelectric plate, an aluminum pad and a copper bar is mounted below a transparent dustproof cover of a moving-coil speaker and at an axial center of the magnetic circuit. The photoelectric plate is provided with a camera, a light shading ring and LED modules; and the photoelectric plate is disposed on a top surface of the aluminum pad. The dual-magnetic steel magnetic circuit is formed by a primary magnetic steel, a secondary magnetic steel, a magnetic post and a magnetic bowl, and a through hole is arranged at the center of the magnetic circuit.

4 Claims, 5 Drawing Sheets

(51) Int. Cl.
*H04N 5/225* (2006.01)
*H04R 1/02* (2006.01)
*H04R 9/02* (2006.01)
*F21Y 115/10* (2016.01)

(52) U.S. Cl.
CPC .......... *H04R 9/025* (2013.01); *F21Y 2115/10* (2016.08); *H04R 2400/11* (2013.01)

(56) References Cited

U.S. PATENT DOCUMENTS

| | | | | |
|---|---|---|---|---|
| 5,426,707 | A | * | 6/1995 | Wijnker ................ H04R 9/022 |
| | | | | 381/165 |
| 5,430,804 | A | * | 7/1995 | Wijnker ................ H04R 9/046 |
| | | | | 381/408 |
| 2010/0316247 | A1 | * | 12/2010 | Ding ...................... G08B 7/066 |
| | | | | 381/397 |
| 2014/0348373 | A1 | * | 11/2014 | Qiu ...................... H04R 31/006 |
| | | | | 381/397 |
| 2018/0013934 | A1 | * | 1/2018 | Germe ................ H04N 5/2252 |

FOREIGN PATENT DOCUMENTS

| | | |
|---|---|---|
| CN | 201830443 U | 5/2011 |
| CN | 102547537 A | 7/2012 |
| CN | 102737467 A | 10/2012 |
| CN | 204131712 U | 1/2015 |
| CN | 205213043 U | 5/2016 |
| JP | 2009118099 A | 5/2009 |
| TW | 201644282 A | 12/2016 |

\* cited by examiner

SOUND, LIGHT AND ELECTRICAL EYE DEVICE FOR POLICE USE

CROSS-REFERENCE TO RELATED APPLICATIONS

This application is a continuation of International Patent Application No. PCT/CN2017/000755, with an international filing date of Dec. 26, 2017, designating the United States, now pending, which is based on Chinese Patent Applications No. 201710003083.3, filed on Jan. 3, 2017. The contents of these specifications are incorporated herein by reference.

TECHNICAL FIELD

The present invention provides a sound, light and electrical eye device for police use, pertaining to the technical field of speakers.

BACKGROUND

It is reported that stampede accidents in the worldwide are common in that in a crowded and noisy environment, policemen for rescue are trapped in the crowds and fail to reach the accident spots to give guidance and evacuation. During the night, evidence taking and alarming are especially hard. If a small-sized device integrating a speaking and illumination, imaging and evidence taking is provided for the policemen to carry by themselves or carried on unmanned aerial vehicle, occurrences of such stampede accidents may be effectively prevented, or effective assistance may be given in case of occurrence of such accidents. With small modularization of LED packaging and miniaturization of cameras, it is possible to design such small-sized devices integrating the functions of speaking and illumination, imaging and evidence taking.

SUMMARY

The present invention is intended to provide a portable inner magnet moving-coil speaker having functions of illumination and image-taking.

In a technical solution according to the present invention, a built-in system formed by a photoelectric plate integrating small-sized LED modules, a light shading ring and a micro-camera, an aluminum pad and a copper bar is mounted below a transparent dustproof cover at an axial central position of the speaker.

The inner magnet moving-coil speaker employs a dual-magnetic steel magnetic circuit formed by a primary magnetic steel, a secondary magnetic steel, a magnetic post and a magnetic bowl.

A back of a wing-shaped basin frame of the inner magnet moving-coil speaker provides positioning for the built-in system and an interface board for communicating a device with an external circuit of the speaker.

The wing-shaped basin frame, the aluminum pad and the copper bar of inner magnet moving-coil speaker form a high-efficiency heat dissipater.

A camera is mounted at a center of the photoelectric plate, a light shading ring is disposed on an outer side of the camera, and a plurality of small-sized LED modules are disposed on an outer side of the light shading ring. The photoelectric plate in the built-in system has an excircle that is synchronized with an excircle of the aluminum pad, and a groove is arranged on each of two sides of the photoelectric plate and docked with a groove of the aluminum pad, which serves as a wiring groove for the photoelectric plate. The photoelectric plate is tightly mounted against the aluminum pad.

A groove is arranged on each of two sides of the circular aluminum pad in the built-in system of the speaker along an axial direction, wherein the groove is docked with the groove of the photoelectric plate to reserve a wiring channel for the photoelectric plate. A hole is provided at an axial center of the aluminum pad to reserve a mounting position for the copper bar. The aluminum pad may also be made of other materials having a high thermal conductivity.

One end of the circular copper bar in the built-in system of the speaker is tightly mounted in the central hole of the aluminum pad, and the other end of the circular copper bar is hinged to a screw thread and provided with a particular pad; wherein the built-in system is fixed to the axial central position of the speaker with the screw thread and the pad shoulder of the copper pad, and a predetermined gap is maintained between the aluminum pad and the secondary magnetic steel and used as a channel for the multi-strand wire bundle.

The aluminum pad and the copper bar may also be made of other materials having a high thermal conductivity.

The dual-magnetic steel magnetic circuit of the inner magnet moving-coil speaker is intended to improve a density of the magnetic flux, and ensure a flexibility indicator of the speaker. The magnetic circuit of the speaker includes a primary magnetic steel, a secondary magnetic steel, a magnetic post and a magnetic bowl. A through hole is arranged at an axial center of the magnetic circuit of the speaker, wherein the through hole is used to mount the copper bar, and the through hole has a diameter that is greater than that of the copper bar, such that a predetermined gap is maintained and thus used as a channel for the multi-strand wire bundle. The through hole of the magnetic bowl is docked with the wire passing hole of the basin frame of the speaker, such that it is smooth between the wire passing hole and the predetermined gap.

The basin frame of the inner magnet moving-coil speaker is a cast aluminum-based wing-shaped basin frame that is integrally cast with a wing-shaped heat dissipater. A nut through hole for fixing the copper bar is arranged at the axial center of the wing-shaped basin frame, wherein the nut through hole is used to mount the copper bar of the built-in system. A wire passing hole is arranged on each of two sides of the nut through hole at the axial center of the wing-shaped basin frame, wherein the wire passing hole is used as a channel for the multi-strand wire bundle. A through hole for fixing the circuit board is arranged at an edge of the back of the wing-shaped basin frame, wherein the through hole is used to mount the interface board. The cast aluminum-based basin frame may also be made of other materials having a high thermal conductivity.

The sound, light and electrical eye device for police use according to the present invention has the following advantages:

1. The photoelectric plate having the functions of illumination and image-taking is mounted in the speaker, which enables the speaker to serve as an all-weather monitoring and alarming device.

2. The dual-magnetic steel magnetic circuit is intended to compensate for the loss of the hole at the center of the magnetic steel. This further reduces the weight and size of the entire system, and achieves portability thereof.

3. With the pad shoulder and the thread of the copper bar, the entire built-in system is tightly fixed to the heat dissipation basin frame, such that a space is reserved between the built-in system and the magnetic circuit, which provides a secure channel for the multi-strand wire bundle for connecting the photoelectric plate and the interface board.

4. The wing-shaped basin frame with the heat dissipation wings improves the heat dissipation effect, and ensures powerful output of the illumination.

5. The interface board on the back of the speaker improves reliability of electrical connection between the entire device and the external circuit.

DETAILED DESCRIPTION

Embodiment 1

FIG. 1 to FIG. 17 schematically show a structure according to this embodiment.

Figure 1:
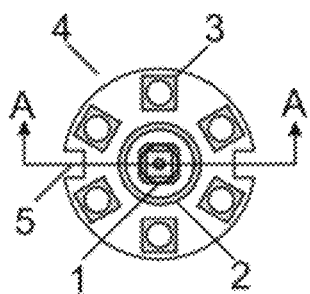
FIG. 1 is a front view of a photoelectric plate integrating small-sized LED modules and a micro camera according to Embodiment 1 of the present invention.
Figure 2:
FIG. 2 is a side view of the photoelectric plate integrating the small-sized LED modules and the micro camera according to Embodiment 1 of the present invention.
Figure 3:
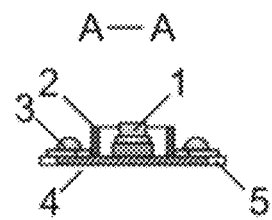
FIG. 3 is an A-A sectional view of the photoelectric plate in FIG. 1.
Figure 4:
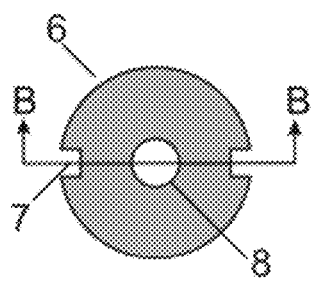
FIG. 4 is a front view of an aluminum pad according to Embodiment 1 of the present invention.
Figure 5:
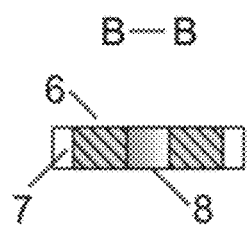
FIG. 5 is a B-B sectional view of the aluminum pad in FIG. 4.
Figures 6, 7:
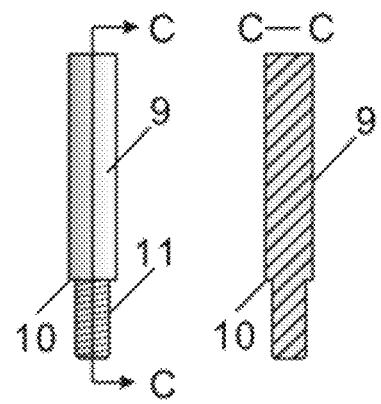
FIG. 6 is a front view of a copper bar according to Embodiment 1 of the present invention.
FIG. 7 is a C-C sectional view of the copper bar in FIG. 6.
Figure 8:
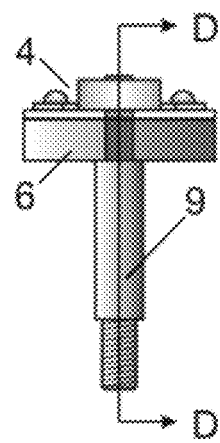
FIG. 8 is a front view of a built-in system according to Embodiment 1 of the present invention.
Figure 9:
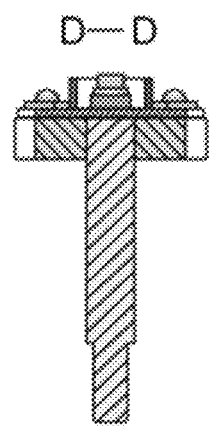
FIG. 9 is a D-D sectional view of the built-in system in FIG. 8.
Figure 10:
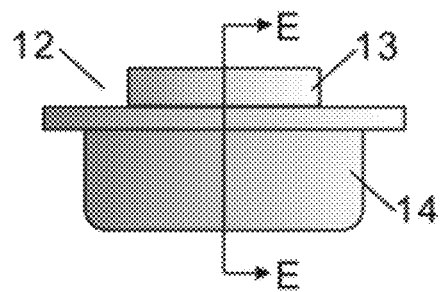
FIG. 10 is a front view of a dual-magnetic steel magnetic circuit according to Embodiment 1 of the present invention.
Figure 11:
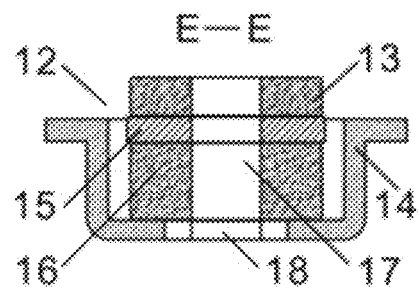
FIG. 11 is an E-E sectional view of the dual-magnetic steel magnetic circuit in FIG. 10.
Figure 12:
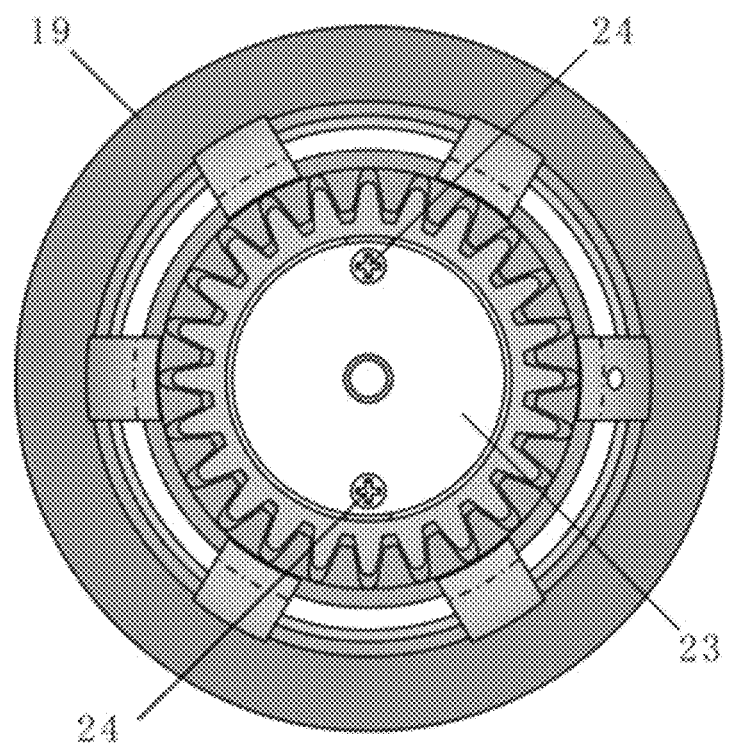
FIG. 12 is a front view of a wing-shaped basin frame according to Embodiment 1 of the present invention.
Figure 13:
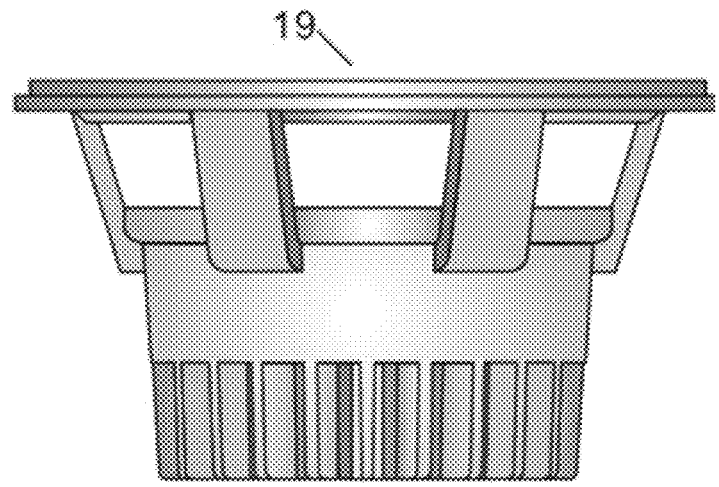
FIG. 13 is a side view of the wing-shaped basin frame according to Embodiment 1 of the present invention.
Figure 14:
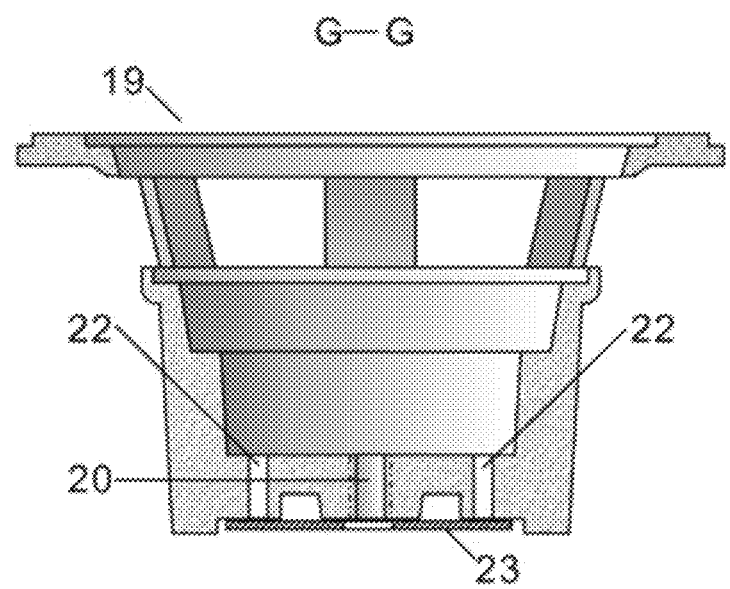
FIG. 14 is a G-G sectional view of the wing-shaped basin frame in FIG. 12.
Figure 15:
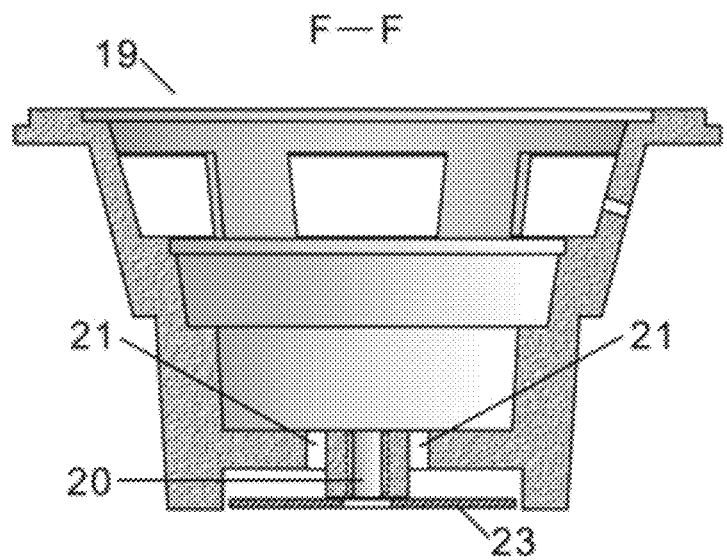
FIG. 15 is an F-F, sectional view of the wing-shaped basin frame in FIG. 12.
Figure 16:
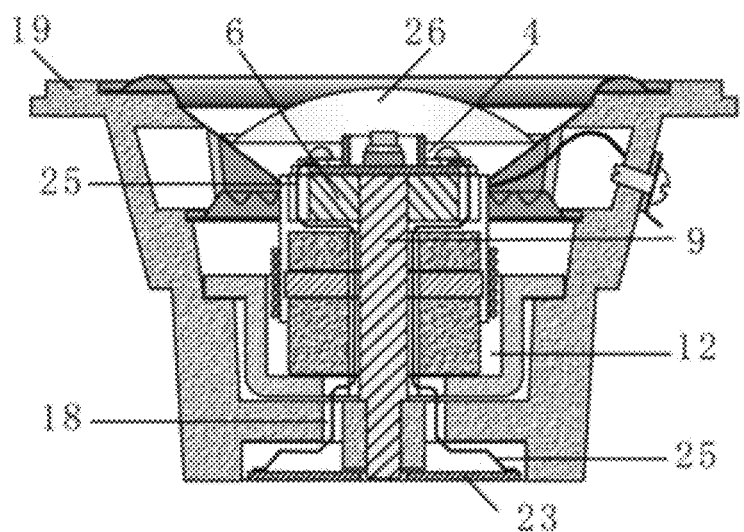
FIG. 16 is an assembly view according to Embodiment 1 of the present invention.
Figure 17:
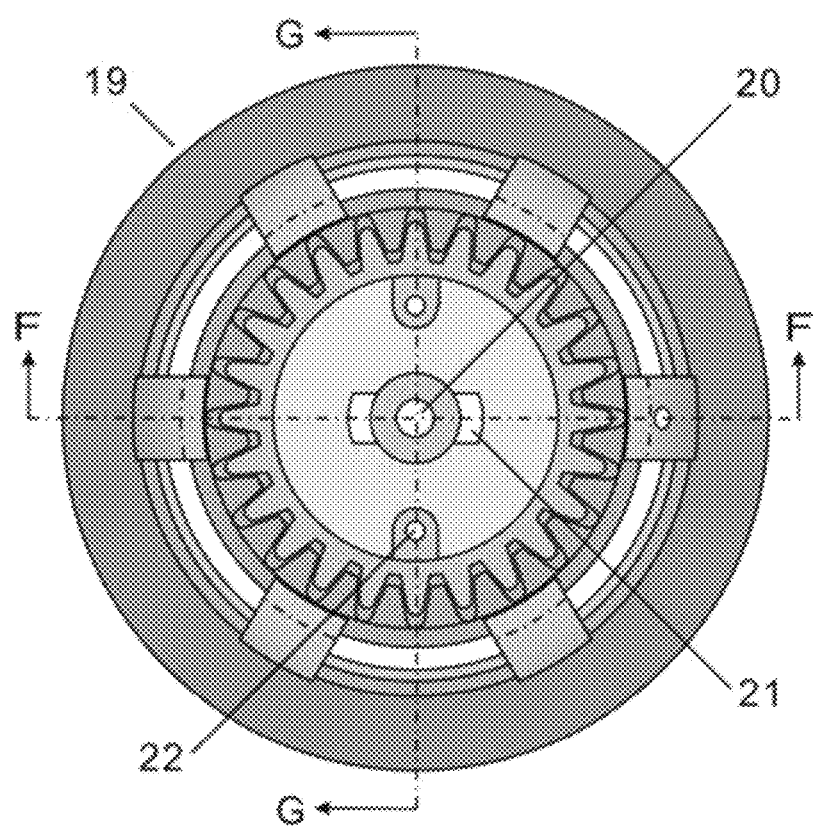
FIG. 17 is an assembly view of an interface board according to Embodiment 1 of the present invention.

FIG. 8 and FIG. 9 show a built-in system according to this embodiment. A camera 1 is mounted at a center of a photoelectric plate 4 in the built-in system, wherein a light shading ring 2 is disposed on an outer side of the camera 1 and configured to prevent interference caused by small-sized LED modules 3 on the outer side of the camera to the micro camera 1. The plurality of small-sized LED modules 3 may cooperatively use visible light, infrared light or laser based on actual needs for operation of the system. An excircle of the photoelectric plate 4 is synchronized with the aluminum pad 4, and a groove 5 is arranged on each of two sides of the photoelectric plate 4 and docked with a groove 7 of the aluminum pad 6. The photoelectric plate 4 is tightly mounted against the aluminum pad 6.

The circular aluminum pad 6 in the built-in system according to this embodiment has an excircle that is less than a magnet post 15, a top surface of the aluminum pad 6 is a mounting position of the photoelectric plate 4, an axial central through hole 8 of the aluminum pad 6 provides a mounting position for a copper bar 9, a groove 7 is arranged on a side surface of the circular aluminum pad 6, which is docked with the groove of the photoelectric plate 4 to provide a wiring channel for the photoelectric plate 4 and meanwhile absorb and conduct the heat of the photoelectric plate 4. The aluminum pad may also be made of other materials having a high thermal conductivity.

One end of the circular copper bar 9 in the built-in system according to this embodiment is tightly mounted in a central hole of the aluminum pad 6, and the other end of the circular copper bar 9 is tightly locked in a nut through hole 20 at an axial center of a heat dissipation basin frame 19 via a screw thread and a pad shoulder 10. The copper bar 9 is particularly provided with the pad shoulder 10, to ensure that a predetermined space is maintained between the aluminum pad 6 and a secondary magnetic steel 13 of the magnetic circuit. In this way, a predetermined space for use as a channel for a multi-strand wire bundle is further maintained between the entire built-in system and the elements of the magnetic circuit. In addition, the copper bar 6 absorbs and conducts the heat of the photoelectric plate 4. The copper bar may also be made of other materials haying a high thermal conductivity.

The dual-magnetic steel magnetic circuit 12 according to this embodiment is formed by a primary magnetic steel 16, a secondary magnetic steel 13, a magnetic post 15 and a magnetic bowl 14. The thicker primary magnetic steel 16 is built in the magnetic bowl 14, and the thinner secondary magnetic steel 13 is mounted on the magnetic post 15. The primary magnetic steel 16, the secondary magnetic steel 13 and the magnetic post 15 are each provided with a through hole 17 at a center of circle thereof along an axial direction, with an aperture being greater than the copper bar 9, such that a predetermined gap is maintained for use as a channel for the multi-strand wire bundle. The magnetic bowl 14 is provided with a through hole 18 at a center of circle thereof along an axial direction, with an aperture being greater than the copper bar 9, wherein the through hole 18 is docked with a wire passing hole 21 at the bottom of the wing-shaped basin frame 19, such that a predetermined gap is maintained for use as a channel for the multi-strand wire bundle.

A nut through hole 20 is arranged at an axial center of the wing-shaped basin frame 19 according to this embodiment, and configured to fix the copper bar 9 in the built-in system and provide a foothold for the built-in system. A wire passing hole 21 is arranged on each of two sides of the nut through hole 20, and is docked with a through hole 18 of the magnetic bowl 14, such that it is smooth between the wire passing hole 21 and the predetermined gap. A through hole 22 is arranged on a back of the wing-shaped basin frame, wherein the through hole 22 is configured to fix an interface board 23.

The interface board 23 and the photoelectric plate 4 according to this embodiment are electrically connected by a multi-strand wire bundle 25 via the predetermined gap.

An assembly process according to this embodiment includes the following steps:

passing the multi-strand wire bundle 25 connecting the photoelectric plate 4 through the through holes 17 and 18 of the magnetic circuit and the wire passing hole 21 of the wing-shaped basin frame;

assembling the aluminum pad 6 and the copper bar 9 to form an entirety, and fixing the entirety to the nut 20 of the wing-shaped basin frame 19 via the thread on the copper bar;

docking the groove of the photoelectric plate 4 carrying the multi-strand wire bundle 25 with the groove of the aluminum pad 6, and adhering the same to the aluminum pad via a thermal conductive adhesive;

electrically connecting the other end of the multi-strand wire bundle 25 to the interface board 23;

locking the interface board 23 to the through hole 22 on the back of the wing-shaped basin frame 19 with a self-tapping screw 24; and mounting the transparent dustproof 26 at the axial center of the paper basin of the speaker to achieve the entire device for police use.

What is claimed is:

1. A sound, light and electrical eye device for police use, comprising a built-in system, and an inner magnet moving-coil speaker, the inner magnet moving-coil speaker employing a dual-magnetic steel magnetic circuit and a wing-shaped basin frame; wherein
    the built-in system formed by a photoelectric plate, an aluminum pad and a copper bar is mounted below a dustproof cover at an axial central position of the inner magnet moving-coil speaker;
    a camera is mounted at a center of the photoelectric plate in the built-in system, a light shading ring being disposed on an outer side of the camera, a plurality of small-sized LED modules being disposed on an outer side of the light shading ring, the plurality of small-sized LED modules cooperatively using visible light, infrared light or laser basin on actual needs for operation of the system;
    the photoelectric plate in the built-in system has an excircle that is synchronized with an excircle of the aluminum pad, a groove is arranged on each of two sides of the photoelectric plate, and the photoelectric plate is tightly mounted against the aluminum pad;
    the circular aluminum pad in the built-in system has an excircle that is less than a magnet post, a top surface of the aluminum pad is a mounting position of the photoelectric plate, an axial central through hole of the aluminum pad provides a mounting position for the copper bar, a side surface of the circular aluminum pad is provided with a groove which is docked with the groove on the photoelectric plate to provide a wiring channel for the photoelectric plate and meanwhile absorb and conduct the heat of the photoelectric plate;
    one end of the circular copper bar in the built-in system is tightly mounted in a central hole of the aluminum pad, and the other end of the circular copper bar is hinged to a screw thread and provided with a particular pad shoulder for positioning, such that a predetermined gap is maintained between the aluminum pad and a secondary magnetic steel of the magnetic circuit, and a predetermined space for use as a channel for a multi-strand wire bundle is maintained between the entire built-in system and elements in the magnetic circuit;
    the dual-magnetic steel magnetic circuit is formed by a primary magnetic steel, a secondary magnetic steel, a magnetic post and a magnetic bowl; wherein the primary magnetic steel is arranged in the magnetic bowl, and the secondary magnetic steel is mounted on the magnetic post; the primary magnetic steel, the secondary magnetic steel and the magnetic post are provided with a through hole along at a center of circle along an axial direction, an aperture of the through hole being greater than the copper bar, such that a predetermined gap is maintained for use as the channel for the multi-strand wire bundle; the magnetic bowl is provided with a through hole at a center of circle along an axial direction, an aperture of the magnetic bowl being greater than the copper bar, and the through hole docking with a wire passing hole at the bottom of the wing-shaped basin frame, such that a predetermined gap is maintained for use as the channel for the multi-strand wire bundle;
    a nut through hole is arranged at an axial center of the wing-shaped basin frame and configured to lock and fix the copper bar in the built-in system and provide a foothold for the built-in system; a wire passing hole is arranged on each of two sides of the nut through hole and docked with the through hole of the magnetic bowl, such that it is smooth between the wire passing hole and the predetermined gap; and a through hole is arranged on a back of the wing-shaped basin frame and configured to fix an interface board; and
    the dustproof cover of the inner magnet moving-coil speaker is transparent.

2. The sound, light and electrical eye device for police use according to claim 1, wherein the basin frame of the speaker is a heat-dissipating wing-shaped basin frame that is cast by using cast aluminum or other materials having a high thermal conductivity; the axial center of the wing-shaped basin frame locks, fixes and mounts the copper bar, the aluminum pad and the photoelectric plate of the built-in system, and these parts are well incorporated to be a high-efficiency heat dissipater of the photoelectric plate.

3. The sound, light and electrical eye device for police use according to claim 1, wherein the groove on the photoelectric plate, the groove on the aluminum pad, the predetermined gap between the aluminum pad and the secondary magnetic steel, the predetermined gap between the through hole on the magnetic circuit and the copper bar, and the wire passing hole on the wing-shaped basin frame establish a secure channel for connecting the photoelectric plate and the interface board for the multi-strand wire bundle.

4. The sound, light and electrical eye device for police use according to claim 1, wherein the photoelectric plate and the interface board are electrically connected by the multi-strand wire bundle in a gap channel reserved inside the speaker.

* * * * *